United States Patent [19]
O'Leary et al.

[11] Patent Number: 6,137,191
[45] Date of Patent: Oct. 24, 2000

[54] SOURCE-TRANSFER SWITCHING SYSTEM AND METHOD

[75] Inventors: Raymond P. O'Leary, Evanston; Thomas J. Tobin, Northbrook, both of Ill.

[73] Assignee: S&C Electric Co., Chicago, Ill.

[21] Appl. No.: 09/219,101

[22] Filed: Dec. 22, 1998

[51] Int. Cl.[7] .................................................. H01H 47/00
[52] U.S. Cl. .............................. 307/125; 307/116; 307/64
[58] Field of Search .................................. 307/18, 23, 29, 307/64, 66, 85, 86, 87

[56] References Cited

U.S. PATENT DOCUMENTS

| | | |
|---|---|---|
| 4,405,867 | 9/1983 | Moakler et al. ........................... 307/64 |
| 5,635,772 | 6/1997 | Lagree et al. .............................. 307/87 |
| 5,808,378 | 9/1998 | O'Leary ..................................... 307/87 |

*Primary Examiner*—Stephen W. Jackson
*Assistant Examiner*—Sharon Polk
*Attorney, Agent, or Firm*—James V. Lapacek

[57] ABSTRACT

A control arrangement and method is provided for source-transfer switching systems including a high-speed control arrangement and high-speed switches to control the transfer of a load from one source to another with minimal transfer delays. The system supplies an electrical load with alternating current from either a first source or a second source via respective first and second switches. The system also includes a controller that samples the voltage waveforms of each of the first and second sources to detect when transfer between the sources is desirable, e.g. power outages, voltage levels that are either too low or too high, or reverse currents that indicate an upstream fault. The controller provides appropriate control signals to control operation of the switches and transfer supply of the load therebetween. In a preferred embodiment, after a transfer decision is made, the control arrangement initiates a transfer of the load from a first source to a second source with no intentional delay via the opening of a first switch and the closing of a second switch. In another embodiment, the control arrangement initiates a transfer by first opening the first switch and then closing the second switch after the current is interrupted through the first switch. In yet another embodiment, transfer is accomplished via an "open" transition, break before make, when severe disturbances of a first category are detected, and transfer is accomplished via a "closed" transition, which may involve make-before-break conditions, when less severe disturbances of a second category are detected.

7 Claims, 1 Drawing Sheet

SOURCE-TRANSFER SWITCHING SYSTEM AND METHOD

BACKGROUND OF THE INVENTION

1. Field of the Invention

The present invention relates generally to source-transfer switching systems and more particularly to a high-speed control arrangement and high-speed switches to control the transfer of a load from one source to another with minimal transfer delays.

2. Description of Related Art

Source-transfer systems for electrical power distribution systems provide power delivery to a load by transferring the supply of the load from a first source to a second independent source when undesirable characteristics are sensed in the first source. One type of source-transfer systems utilize relatively lower-speed control systems and mechanical switches, for example, requiring in the range of ten to several hundred cycles of the source frequency to accomplish transfer of the load between two sources. These systems are arranged to operate in a "break before make" fashion such that the current is interrupted from one source to the load before the second source is connected. Another type of source-transfer system, illustrated in U.S. Pat. Nos. 5,070,252 and 3,936,782, is utilized in a "make before break" mode to transfer a load between two sources by momentarily paralleling the sources when the sources are each viable.

Another type of source-transfer system denoted the "FasTran25" utilizes high-speed vacuum switches operated by solenoids. The "FasTran25" system is stated to accomplish transfer within approximately 24 milliseconds and is described in publication DB770-512, dated August 1998, available from Joslyn Hi-Voltage Corp. of Cleveland, Ohio.

Yet another type of source-transfer switching system commonly utilizes solid-state switches, which can also be characterized as static transfer switches. The control arrangements sample the voltage waveforms of each source to detect when transfer between the sources is necessary, e.g. sensing outages and momentary interruptions as well as voltage sags and swells based on the source supplying the load being above or below preset levels. For example, see U.S. Pat. Nos. 5,808,378 and 5,644,175.

While these arrangements may be useful and generally satisfactory for their intended purposes, the transfer systems of the prior art either require expensive solid-state switches or introduce delays in transfer times.

SUMMARY OF THE INVENTION

Accordingly, it is a principal object of the present invention to a source-transfer switching system that utilizes a high-speed control arrangement and high-speed switches to control the transfer of a load from one source to another with minimal transfer delays.

It is another object of the present invention to provide a source-transfer switching system that does not introduce any intentional delay after a transfer decision has been made and before transferring the load from one source to another via the opening of one switch and the closing of a second switch.

It is a further object of the present invention to provide a source-transfer switching system that accomplishes transfer between sources via an "open" transition, break before make, when severe disturbances of a first category are detected and that accomplishes transfer via a "closed" transition, which may involve a make before break condition, when less severe disturbances of a second category are detected.

These and other objects of the present invention are efficiently achieved by the provision of a source-transfer switching systems that utilizes a high-speed control arrangement and high-speed switches to control the transfer of a load from one source to another with minimal transfer delays. The system supplies an electrical load with alternating current from either a first source or a second source via respective first and second switches. The system also includes a controller that samples the voltage waveforms of each of the first and second sources to detect when transfer between the sources is desirable, e.g. power outages, voltage levels that are either too low or too high, or reverse currents that indicate an upstream fault. The controller provides appropriate control signals to control operation of the switches and transfer supply of the load therebetween. In a preferred embodiment, after a transfer decision is made, the control arrangement initiates a transfer of the load from a first source to a second source with no intentional delay via the opening of a first switch and the closing of a second switch. In another embodiment, the control arrangement initiates a transfer by first opening the first switch and then closing the second switch after the current is interrupted through the first switch. In yet another embodiment, transfer is accomplished via an "open" transition, break before make, when severe disturbances of a first category are detected, and transfer is accomplished via a "closed" transition, which may involve make before break conditions, when less severe disturbances of a second category are detected.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
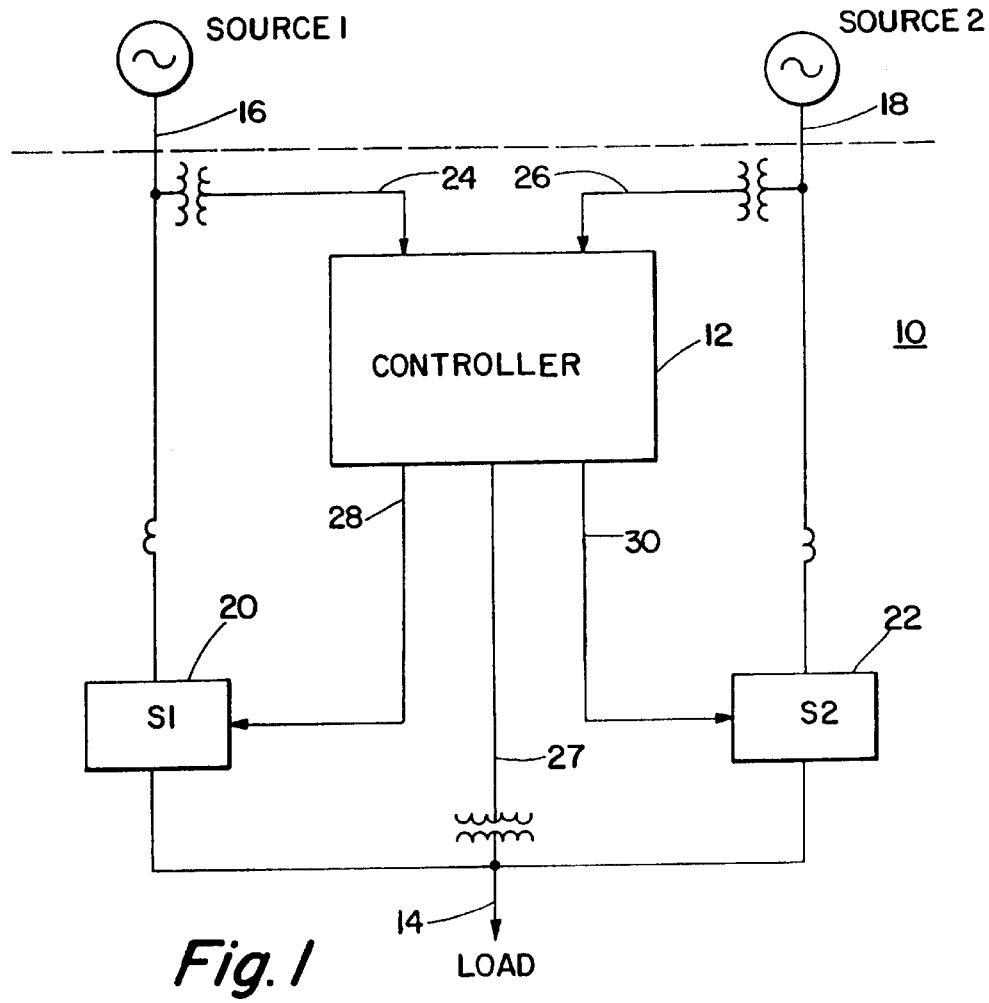
FIG. 1 is a block diagram representation of a source-transfer switching system in accordance with the present invention.

Referring now to FIG. 1, a source-transfer switching system 10 (system 10 hereafter) includes a controller stage 12 and switches 20, 22 (designated S1 and S2 respectively in FIG. 1). The system 10 supplies a load at 14 with an alternating-current waveform via either a first AC source at 16 or a second AC source at 18. The first and second AC sources 16 and 18 and the load at 14 as provided in an electrical power distribution system are typically multi-phase circuits which are represented in FIG. 1 by a one-line diagram. The system 10 via the controller stage 12 controls either the switch 20, S1 to supply the load at 14 via the first source 16 or controls the switch 22,S2 to supply the load at 14 via the second source 18. In one illustrative example, the switches 20, 22 are vacuum interrupters. The controller stage 12 may also be characterized as a transfer control arrangement.

The controller stage 12 samples the voltage waveforms of each source 16, 18, e.g. via respective sensing inputs at 24, 26 to detect when transfer between the sources is desirable, e.g. sensing outages and momentary interruptions as well as voltage sags and swells based on the source supplying the load being above or below preset levels. The controller stage 12 provides appropriate switch actuator signals at 28, 30 to control the operation of each respective switch S1 and S2 to accomplish the transfer with minimal delays. For example, assume that S1 is closed by the controller stage 12 via signals at 28 so as to supply the load at 14. If the controller stage 12 via the sensing input 24 senses that the voltage of the first source at 16 is exhibiting undesirable characteristics, the controller stage 12 via the control signals at 28, 30 opens S1 and closes S2 so as to transfer the supply of the load at 14 from the first source at 16 to the second source at 18. As used herein, the term "incoming" is used to describe the switch that will be closed to supply the load from its respective source (e.g. the second source at 18 and S2 in the illustrative example), and the term "outgoing" is used to describe the switch that is being opened to interrupt current from its respective source (e.g. the first source at 16 and S1 in the illustrative example).

In a preferred embodiment and in accordance with important aspects of the present invention, after a transfer decision is made, the controller stage 12 opens the closed switch and closes the open switch without any intentional delay. In this manner, the incoming switch may be closed before the current through the outgoing switch is interrupted, such that the sources 16 and 18 are momentarily paralleled. However, since the switch operating times are very short, e.g. less than 1–2 cycles of the AC source frequency (e.g. 50–60 Hz.), this does not present a problem since the overall control method normally keeps the sources disconnected and eliminates undesirable circulating currents. For embodiments where momentary paralleling of the sources may occur, the switches S1 and S2 are fault interrupters, i.e. having fault-interrupting capabilities.

While connecting the two sources is not generally advantageous where the sag is very deep, i.e. near zero voltage, due to the effect on the incoming source, the momentary paralleling is acceptable to achieve minimal transfer delays because the overall speed with which the system returns to an unfaulted state is desirable as defined by ITIC (formerly CBEMA) parameters and guidelines. Further, for shallow or moderate sags, connecting the two sources is actually advantageous because the sag on the outgoing source is immediately relieved, to some degree, due to the incoming source. For example, if the source impedance of the incoming source is about equal to the impedance between the system 10 and the fault on the outgoing source, then the sag is approximately reduced by one-half during the period that the sources are connected together. Actually, the system 10 then behaves similarly to systems which are predicated on running with the two sources normally connected together. Accordingly, the overall transfer profile of the system 10 can restore the system to an unfaulted condition in less than 1–2 cycles of the AC source frequency (e.g. 50–60 Hz.).

In another embodiment where the outgoing switch is actuated to open before the incoming switch is tripped to close, such that the current in the outgoing switch is interrupted before the incoming switch is closed, the overall transfer time is still typically less than four cycles.

In yet another embodiment, the system 10 accomplishes transfer between sources via an "open" transition, break before make, when severe disturbances of a first category are detected and accomplishes transfer via a "closed" transition, which may involve make before break conditions, when less severe disturbances of a second category are detected.

Figure 2:
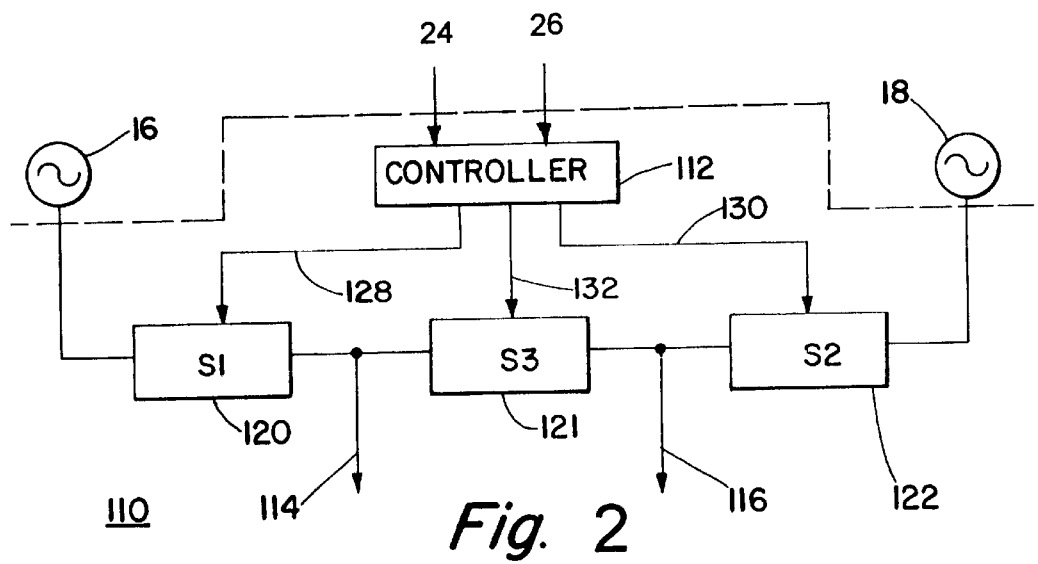
FIG. 2 is a block diagram representation of another common circuit configuration for which the source-transfer switching system of the present invention is suitable.

Considering other circuit configurations for which the present invention is suitable and referring now additionally to FIG. 2, a controller 112 of a source-transfer switching system 110 controls three switches S1, 120, S2, 122 and S3 121 via respective control signal paths 128, 130, and 132. The specific illustrative circuit configuration of FIG. 2 implements a split-bus primary selective system, which is used to split the load during normal operation. Specifically, in normal operation, a first source 16 supplies a first load circuit 114 via S1 and a second source 18 supplies a second load circuit 116 via S2, with S3 normally being open and functioning as a bus-tie switch. Thus, each of the sources 16, 18 is a preferred source for its respective load circuit 114, 116 and each is an alternate source for the other load circuit, 116, 114 respectively. When one of the sources at 16, 18 is lost or exhibits undesirable characteristics, the controller 112, in accordance with the various control embodiments discussed hereinbefore, opens one of the switches S1 or S2 and closes the switch S3 such that the load circuits 114, 116 are supplied from one of the sources at 16 or 18. For example, if the source 16 is lost, S1, 120 will be opened and S3, 121, the bus-tie switch, will be closed to supply the load circuit 114 while S2, 122 remains closed and continues to supply the load circuit 116.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed and desired to be secured by Letters Patent of the United States is:

1. A source-transfer system of the type where a common load connection is supplied by one of two sources, the system comprising:

two switches, each of said two switches having open and closed operative states and being connected to supply the common load connection through a respective one of the two sources; and control means for actuating said two switches and being responsive to predetermined transfer conditions to actuate opening of a first of said switches and closing of the second of said switches with no introduction of any intentional delay after detection of a transfer condition so as to relieve the predetermined transfer conditions and such that intentional paralleling of the two sources may occur with the two sources being at substantially different levels.

2. The source-transfer system of claim 1 wherein said control means operates to intentionally result in a momentary paralleling of the sources.

3. The source-transfer system of claim 1 wherein said control means controls transfer between the two sources by first opening one of the switches and then closing the other of the switches when severe disturbances are detected, and controls transfer between the sources via operation of the switches with no intentional delay when less severe disturbances are detected.

4. A control arrangement for a source-transfer switching system of the type that includes two input source connections, two load connections, and three switches each having respective first and second circuit connections and open and closed operative states, the switches being connected in circuit via the first and second circuit connections, the load connections and the input source connections so as to selectively supply the load connections from one of the input source connections, the control arrangement comprising transfer control means for controlling the switches so as to selectively supply the load connections from one or more of the input source connections through at least two of the switches and for actuating the switches and being responsive to predetermined transfer conditions to actuate opening of one or more of the switches and closing of one or more other of the switches with no intentional delay.

5. The control arrangement of claim 4 wherein the three switches are provided in a normal configuration wherein a first switch supplies power to a first load circuit from a first source connection and a second switch supplies power to a second load circuit from a second source connection, the third switch having its first and second circuit connections being connected between the first and second load circuits and being normally nonconducting, said first means being responsive to said predetermined transfer conditions to open one of the first or second switches and close the third switch.

6. A method for transferring a load between a first source connected to the load by a first switch and a second source connected to the load by a second switch, the method comprising detecting a transfer condition, controlling transfer between the two sources by first opening one of the switches and then closing the other of the switches when severe disturbances are detected, and additionally controlling transfer between the sources via operation of the switches with no introduction of any intentional delay after the detection of a transfer condition when less severe disturbances are detected to relieve the detected transfer conditions and such that intentional paralleling of the two sources may occur as in a system predicated on the sources being connected together.

7. A source-transfer system of the type where a common load connection is supplied by one of two sources, the system comprising:

two switches, each of said two switches having open and closed operative states and being connected to supply the common load connection through a respective one of the two sources; and control means for actuating said two switches and being responsive to predetermined transfer conditions to actuate opening of a first of said switches and closing of the second of said switches without the introduction of any intentional delay after detection of a transfer condition and such that momentary paralleling of the two sources may occur without regard to the levels of the two sources.

* * * * *